(12) United States Patent
Hartenstein

(10) Patent No.: US 11,255,520 B2
(45) Date of Patent: Feb. 22, 2022

(54) LIGHTING FIXTURE COMPRISING MAGNETIC BASE CONNECTED TO LIGHTING ELEMENT

(71) Applicant: AAC Enterprises LLC, Metairie, LA (US)

(72) Inventor: Justin Hartenstein, Metairie, LA (US)

(73) Assignee: AAC Enterprises LLC, Metairie, LA (US)

( * ) Notice: Subject to any disclaimer, the term of this patent is extended or adjusted under 35 U.S.C. 154(b) by 0 days.

(21) Appl. No.: 17/002,535

(22) Filed: Aug. 25, 2020

(65) Prior Publication Data

US 2021/0063001 A1 Mar. 4, 2021

Related U.S. Application Data

(60) Provisional application No. 62/895,796, filed on Sep. 4, 2019.

(51) Int. Cl.
| | | |
|---|---|---|
| *F21V 19/00* | (2006.01) | |
| *F21V 21/096* | (2006.01) | |
| *B60Q 1/26* | (2006.01) | |
| *F16B 23/00* | (2006.01) | |
| *F21Y 113/13* | (2016.01) | |
| *F21Y 115/10* | (2016.01) | |

(52) U.S. Cl.
CPC ........ *F21V 19/0055* (2013.01); *B60Q 1/2615* (2013.01); *F16B 23/00* (2013.01); *F21V 21/096* (2013.01); *F21Y 2113/13* (2016.08); *F21Y 2115/10* (2016.08)

(58) Field of Classification Search
CPC . F21V 19/0055; F21V 21/096; B60Q 1/2615; B60Q 1/0088; F16B 23/00; F21Y 2113/13; F21Y 2115/10; F21S 45/00; F21S 43/14
See application file for complete search history.

(56) References Cited

U.S. PATENT DOCUMENTS

| | | | | |
|---|---|---|---|---|
| 6,149,288 | A * | 11/2000 | Huang | B60Q 1/2615 |
| | | | | 362/545 |
| 9,080,741 | B2 * | 7/2015 | Mignot | F21S 2/005 |
| 10,145,552 | B2 | 12/2018 | Fay | |
| 10,989,382 | B2 * | 4/2021 | Jha | B64D 47/02 |
| 11,029,084 | B2 * | 6/2021 | Thomas | A47F 11/10 |
| 2020/0262337 | A1 * | 8/2020 | Hartenstein | H05K 1/024 |

* cited by examiner

*Primary Examiner* — Tracie Y Green
(74) *Attorney, Agent, or Firm* — Edwin A. Sisson, Attorney at Law, LLC; Jeffrey J. Banyas

(57) ABSTRACT

It is described herein a lighting fixture. The lighting fixture may comprise a base, a lighting element, an attachment mechanism, and an optional spacer. In embodiments where the spacer is not present, the base may comprise a base recess within a top surface of the base for routing of an electrical communication connection of the lighting element. In embodiments where the spacer is present, the spacer may comprise a spacer recess within a top surface of the spacer for routing of the electrical communication connection. The base, the lighting element, and the optional spacer may be connected to one another by the attachment mechanism. Also described herein is a lighting fixture kit comprising a base, a lighting element, an attachment mechanism, and optionally a spacer.

11 Claims, 10 Drawing Sheets

LIGHTING FIXTURE COMPRISING MAGNETIC BASE CONNECTED TO LIGHTING ELEMENT

CROSS REFERENCES AND PRIORITIES

This Application claims priority from U.S. Provisional Application No. 62/895,796 filed on 4 Sep. 2019, the teaching of which are incorporated by reference herein in their entirety.

BACKGROUND

Since the initial development of light-emitting diodes ("LEDs"), their use as illumination devices has become increasingly popular over more traditional illumination devices such incandescent or fluorescent lights. Many applications exist for LEDs, including residential, commercial, and automotive lighting.

Specific to automotive lighting, most vehicles such as cars, trucks, sport utility vehicles, and the like are manufactured with a variety of lighting elements including headlights, turn signal lights, taillights, and marker lights. However, in recent years, efforts have been made to customize the aesthetics and performance of automotive lighting systems. These efforts may include replacing the factory lighting elements (headlights, turn signal lights, taillights, marker lights, etc.)—which utilize incandescent lighting—with LEDs. Other efforts may include adding additional lighting elements to the vehicle such as flood lights, rock lights, puddle lights, and accent lights.

Many devices and methods have been developed for attaching additional lighting elements to a vehicle. The simplest involves using an adhesive such as glue or tape to secure the new lighting element to the vehicle through an adhesive bond. However, these adhesives may result in less-than desirable aesthetics, and often lose their adhesive bond over time causing the lighting element to come partially or fully unattached from the vehicle.

Other devices and methods for attaching additional lighting elements to a vehicle include the use of fasteners such as screws or bolts which pass through the lighting element and secure into a location on the vehicle or vice versa. In practice, securing lighting elements to a vehicle in this manner takes time to ensure proper alignment. This also requires the user to make one or more holes in the vehicle, which may not be desirable particularly when the lighting element is to be secured to critical structural elements such as the chassis or subframe.

Some have proposed the use of magnets for securing additional lighting elements to a ferrous surface of a vehicle. One such device is disclosed in U.S. Pat. No. 10,145,552 B2 which discloses "the magnets may be glued, soldered, or otherwise affixed to the LEDs." (internal citations omitted). In practice, such devices in which the magnets are affixed onto the LED itself may not have sufficient durability—particularly in applications such as vehicle undercarriages and when used in off-road vehicles. Additionally, affixing the magnet directly to the LED itself limits the ability to change the shape and structure of the lighting fixture to accommodate its use on different areas having different surface features.

The need exists, therefore, for an improved device for attaching a lighting element to a surface, particularly a surface of a vehicle.

SUMMARY

A lighting fixture is disclosed. The lighting fixture may comprise a base, a lighting element, and an attachment mechanism. The base may comprise a base length dimension and a base width dimension defining a base perimeter having a base perimeter shape. The base may further comprise a base top surface and a base bottom surface opposite the base top surface. The base may further comprise at least one magnet. The lighting element may comprise a printed circuit board and a plurality of light emitting diodes each mounted on the printed circuit board. The printed circuit board may be electrically connected to a power source. The attachment mechanism may connect the base to the lighting element.

In some embodiments, the base consists of a magnet. In other embodiments the base bottom surface may have at least one magnet hole. In such embodiments, the number of magnet holes may be equal to a number of magnets of the at least one magnet. In such embodiments, each magnet may be connected to the base within one of the magnet holes.

In certain embodiments, the base top surface may have at least one base recess. In some such embodiments, at least one of the at least one base recess may extend from the base top surface through the base bottom surface.

In some embodiments, the plurality of light emitting diodes may comprise at least one white LED. In certain embodiments, the plurality of light emitting diodes may comprise at least one color changing LED.

In certain embodiments, the lighting element may comprise a housing. The housing may at least partially surround the printed circuit board. When used, the housing may comprise a housing length dimension and a housing width dimension which define a housing perimeter having a housing perimeter shape. In some embodiments, the light element may further comprise a lens.

In some embodiments, the attachment mechanism may be selected from the group consisting of at least one screw, at least one screw with a nut, at least one bolt, at least one bolt with a nut, at least one snap in attachment mechanism, an adhesive, at least one rivet, at least one clip, and combinations thereof.

In certain embodiments, the base may comprise at least one base attachment hole passing from the base top surface through the base bottom surface, the lighting element may comprise at least one lighting element attachment hole aligned with the at least one base attachment hole, the attachment mechanism may pass through the at least one base attachment hole and the at least one lighting element attachment hole, and the attachment mechanism may be a threaded fastener with or without a nut. In some such embodiments, the threaded fastener may comprise a tapered head, and the at least one base attachment hole may be countersunk at the base bottom surface.

In some embodiments, the at least one magnet may comprise one or more magnets selected from the group consisting of rare-earth magnets, ferrite magnets, ceramic magnets, electromagnets, and combinations thereof. In certain embodiments, the at least one magnet may comprise a plurality of magnets, and the plurality of magnets may have a total pull force. In some such embodiments, the total pull force may be equal to or greater than a weight of the lighting fixture. In certain such embodiments, the total pull force may be in a range selected from the group consisting of between 5 N and 2,000 N, between 5 N and 1,000 N, between 5 N and 500 N, between 5 N and 250 N, between 5 N and 100 N, and between 5 N and 50 N.

In certain embodiments, the lighting fixture may further comprise a spacer. The spacer, when present, may comprise a spacer length dimension and a spacer width dimension which define a spacer perimeter having a spacer perimeter shape. The spacer may also comprise a spacer top surface having at least one spacer recess, and a spacer bottom surface opposite the spacer top surface. When used, the spacer may be between the base and the lighting element with the spacer bottom surface in contact with the base top surface. In embodiments comprising a spacer, the attachment mechanism may connect the base, the spacer and the lighting element.

In some embodiments comprising a spacer, at least one of the at least one spacer recess may extend from the spacer top surface through the spacer bottom surface. In certain such embodiments, the base may further comprise at least one base recess extending from the base top surface through the base bottom surface.

In certain embodiments comprising a spacer, the base may comprise at least one base attachment hole passing from the base top surface through the base bottom surface. In such embodiments, the spacer may comprise at least one spacer attachment hole passing from the spacer top surface through the spacer bottom surface aligned with the at least one base attachment hole. In such embodiments, the lighting element may comprise at least one lighting element attachment hole aligned with the at least one base attachment hole and the at least one spacer attachment hole. In such embodiments, the attachment mechanism may pass through the at least one base attachment hole, the at least one spacer attachment hole, and the at least one lighting element attachment hole. In some such embodiments, the attachment mechanism may be a threaded fastener with or without a nut.

In some embodiments comprising a spacer, the spacer may further comprise a lip. The lip, when present, may extend from the spacer top surface along at least a portion of the spacer perimeter.

A lighting fixture kit is also disclosed. The lighting fixture kit may comprise a base comprising at least one magnet, a lighting element, and at least one attachment mechanism. In some embodiments, the lighting fixture kit may further comprise a spacer.

DETAILED DESCRIPTION

Disclosed herein is a lighting fixture. The lighting fixture is described below with reference to the Figures. As described herein and in the claims, the following numbers refer to the following structures as noted in the Figures.

10 refers to a lighting fixture.
100 refers to a base.
110 refers to a base length dimension.
120 refers to a base width dimension.
130 refers to a base top surface.
135 refers to a base recess.
140 refers to a base bottom surface.
145 refers to a magnet hole.
150 refers to a magnet.
152 refers to a magnet thickness dimension.
155 refers to a first fastener.
160 refers to a base attachment hole.
200 refers to a lighting element.
210 refers to a printed circuit board.
220 refers to a light emitting diode.
230 refers to an electrical communication connection.
240 refers to a housing
242 refers to a housing length dimension.
244 refers to a housing width dimension.
246 refers to a housing bottom surface.
247 refers to a removable panel.
248 refers to a housing top surface.
250 refers to a lens.
260 refers to a lighting element attachment hole.
300 refers to a spacer.
310 refers to a spacer length dimension.
320 refers to a spacer width dimension.
330 refers to a spacer top surface.
335 refers to a spacer recess.
340 refers to a spacer bottom surface.
350 refers to a lip.
360 refers to a spacer attachment hole.
400 refers to an attachment mechanism.

Figure 1:
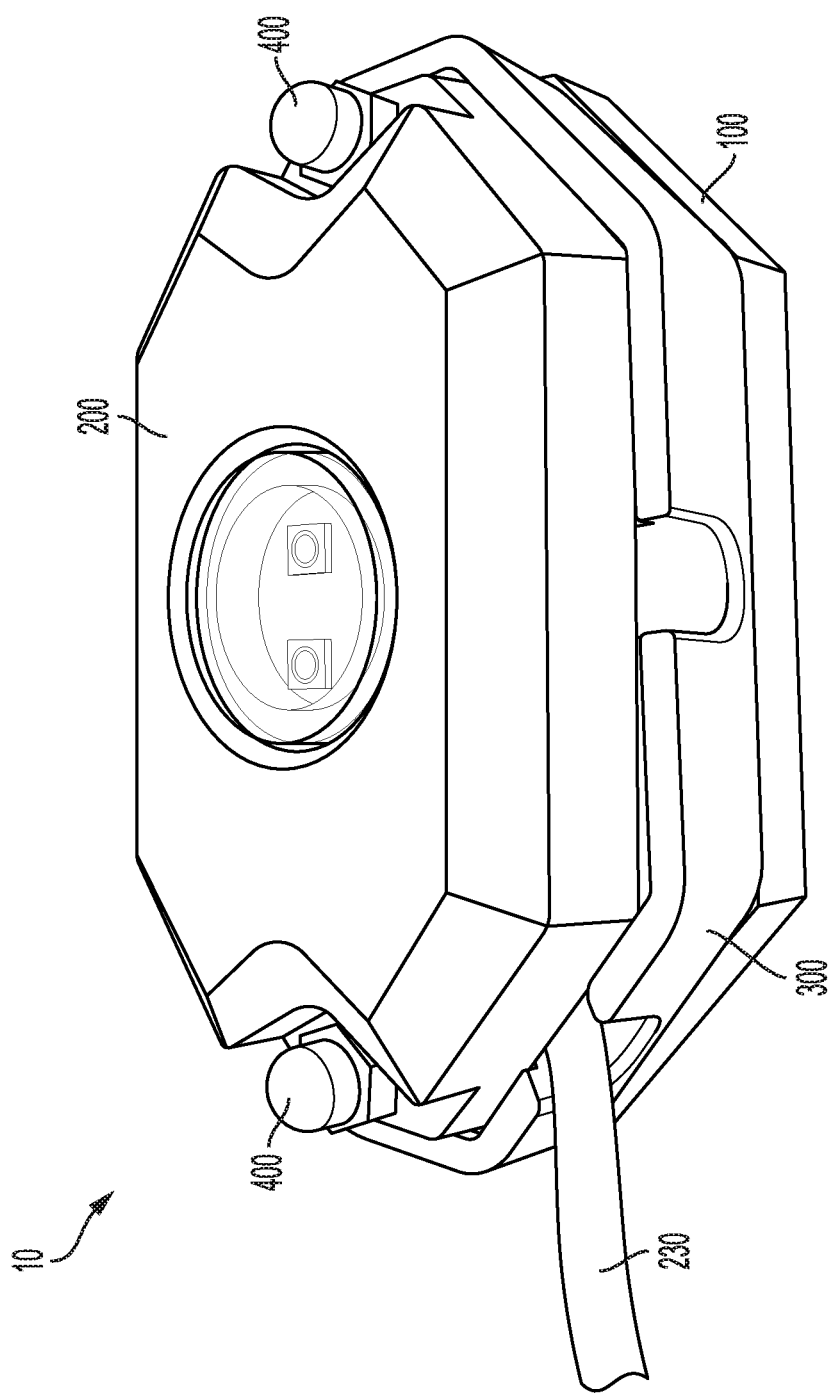
FIG. 1 is a perspective view of a lighting fixture.
Figure 3:
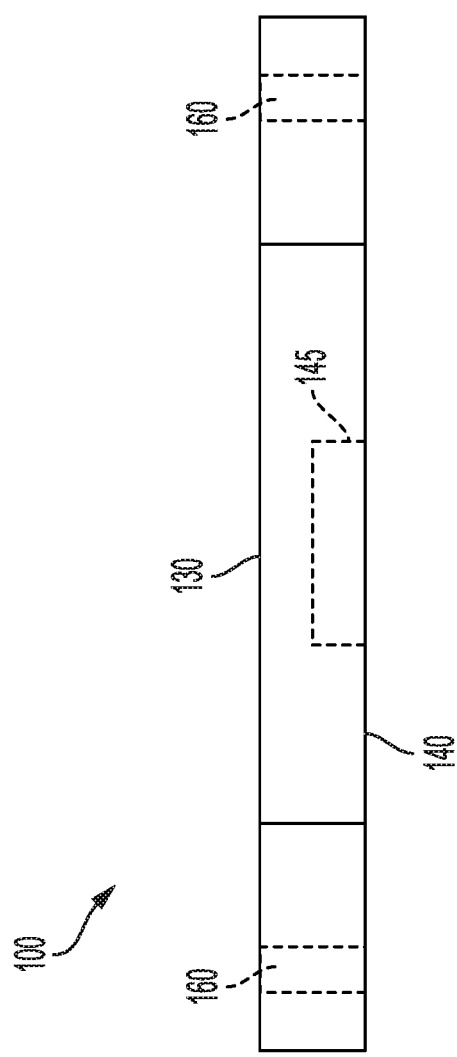
FIG. 3 is a side view of a base.
Figure 5:
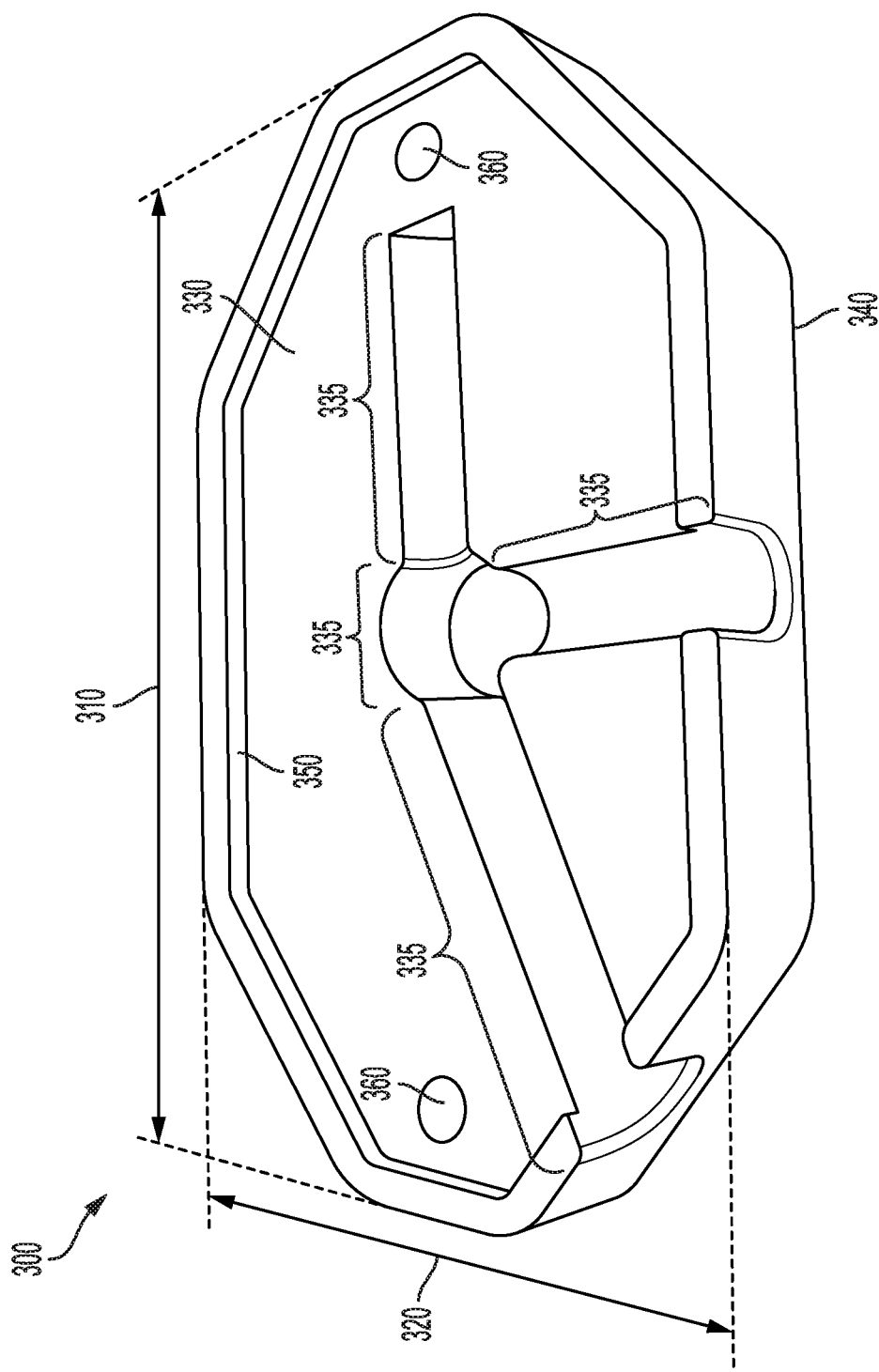
FIG. 5 is a perspective view of a spacer.

FIG. 1 depicts a perspective view of one embodiment of a lighting fixture (10). As shown in FIG. 1, the lighting fixture may comprise a base (100), a lighting element (200), a spacer (300), and an attachment mechanism (400) which connects the base, the lighting element, and the spacer. It should be noted that the spacer is considered an optional element, and embodiments may exist without a spacer such as those described herein with reference to FIG. 9 and FIG. 10. As shown in FIG. 1, the spacer may be located between the base and the lighting element with the spacer bottom surface (340 as shown in FIG. 5) in contact with the base top surface (130 as shown in FIG. 3).

Figure 2:
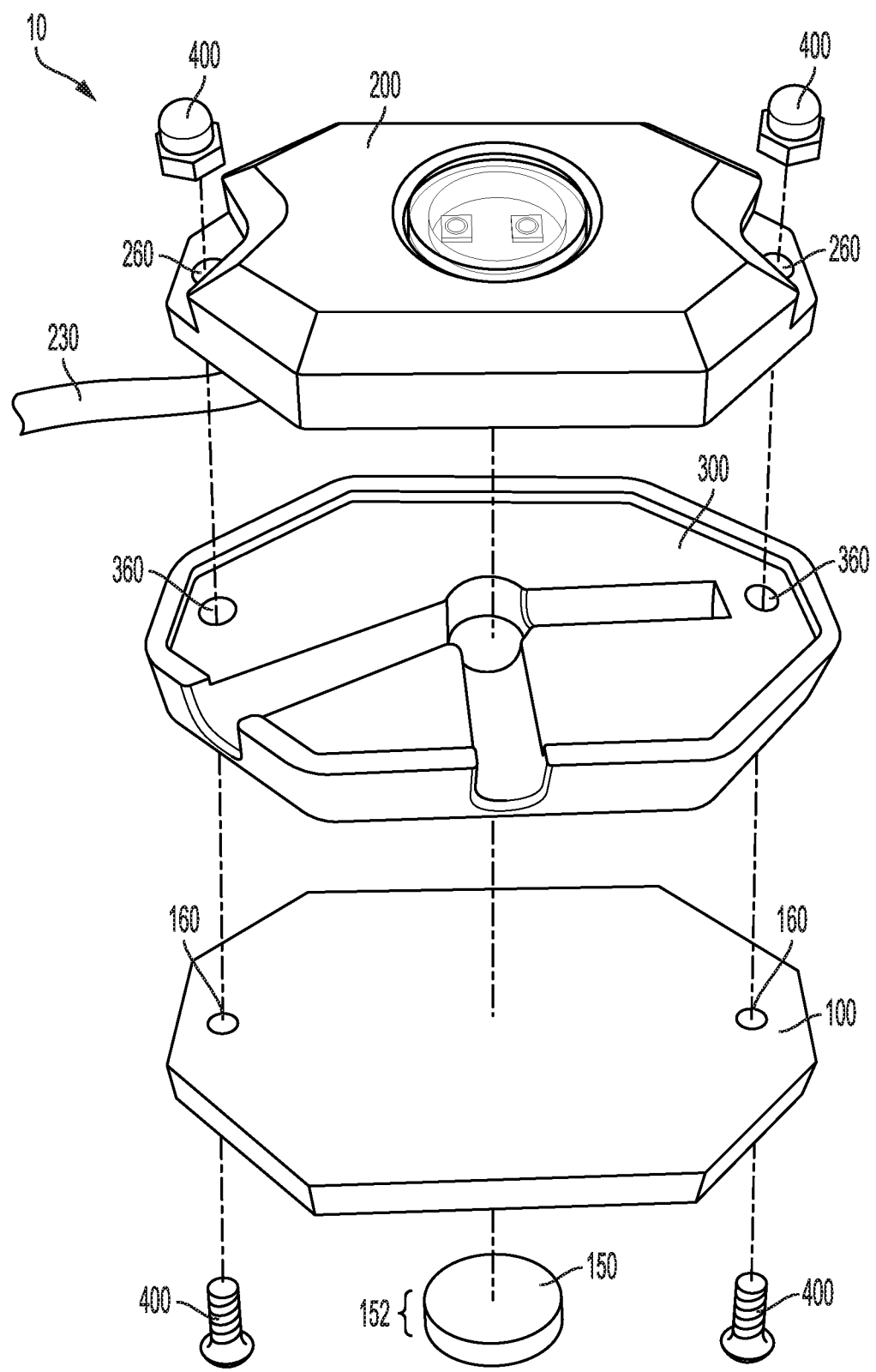
FIG. 2 is an exploded perspective view of the lighting fixture of FIG. 1.

FIG. 2 depicts an exploded perspective view of the embodiment of a lighting fixture (10) shown in FIG. 1. As shown in FIG. 2, the attachment mechanism (400) may be a threaded fastener with or without a nut. Examples of threaded fasteners include a screw and a bolt. Other attachment mechanisms may include a snap in attachment mechanism, an adhesive, a rivet, and a clip. In other words, the attachment mechanism may be selected from the group consisting of at least one screw, at least one screw with a nut, at least one bolt, at least one bolt with a nut, at least one snap in attachment mechanism, an adhesive, at least one rivet, at least one clip, and combinations thereof.

In embodiments where the attachment mechanism (400) is selected from the group consisting of at least one screw with a nut, at least one bolt with a nut, and combinations thereof, the base (100), the lighting element (200), and the spacer (300) may also comprise one or more attachment holes as shown in FIG. 2. For example, the base may comprise at least one base attachment hole (160) passing from the base top surface (130 as shown in FIG. 3) through the base bottom surface (140 as shown in FIG. 3). Additionally, the lighting element may comprise at least one lighting element attachment hole (260). Finally, the spacer may comprise at least one spacer attachment hole (360) passing from the spacer top surface (330 as shown in FIG. 5) through the spacer bottom surface (340 as shown in FIG. 5). The number of base attachment holes, spacer attachment holes, and lighting element attachment holes is not considered important, and will vary depending upon a number of factors including the desired use of the lighting fixture. As shown in FIG. 2, each of the base, the lighting element, and the spacer comprises two attachment holes. In practice, the number of base attachment holes should equal the number of lighting attachment holes, and the number of base attachment holes and lighting attachment holes should equal the number of spacer attachment holes.

In such embodiments, when assembled, at least one of the spacer attachment holes (360) will be vertically aligned with at least one of the base attachment holes (160) as shown in FIG. 2. Further, at least one of the lighting element attachment holes (260) will be vertically aligned with the spacer attachment hole that is vertically aligned with the base attachment hole as shown in FIG. 2. In embodiments where each of the base (100), the lighting element (200), and the spacer (300) comprises multiple attachment holes, it is preferred that each base attachment hole be vertically aligned with a corresponding spacer attachment hole and a corresponding lighting element attachment hole as shown in FIG. 2. The vertical alignment of the attachment holes allows an attachment mechanism (400) to pass through the at least one base attachment hole, the at least one spacer attachment hole, and the at least one lighting element attachment hole to attach the base, the spacer, and the lighting element to one another as shown in FIG. 1. In practice, it is preferred that a separate attachment mechanism passes through each separate set of a base attachment hole, a spacer attachment hole, and a lighting element attachment hole as shown in FIG. 1 and FIG. 2.

It may be desirable to maintain a flat bottom surface to the base (100) to improve the contact area between the base and the surface to which the lighting fixture (10) is attached. To accommodate this, in some embodiments, the base attachment hole(s) (160) may be countersunk at the base bottom surface (140) as shown in FIG. 4 allowing the base attachment holes to accept a screw or bolt having a tapered head as shown in FIG. 2.

FIG. 3 depicts a side view of one embodiment of a base (100). As shown in FIG. 3, the base has a base top surface (130) and a base bottom surface (140) opposite of the base top surface. The base may also have a magnet hole (145) in the base bottom surface.

Figure 4:
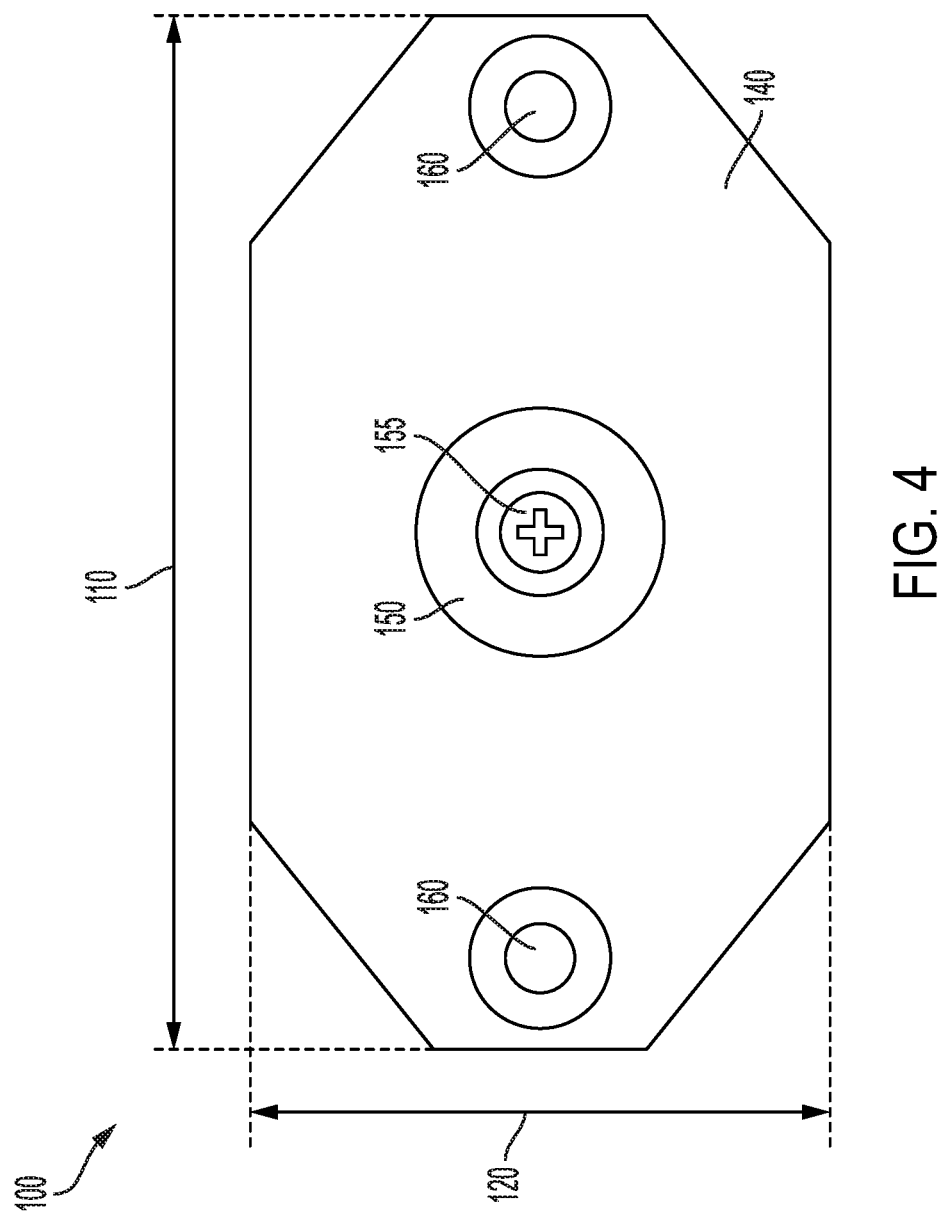
FIG. 4 is a bottom view of the base of FIG. 3.

The base (100) is further shown in FIG. 4, which is a bottom view of the base. As shown in FIG. 4, the base has a base length dimension (110) and a base width dimension (120) which define a base perimeter having a base perimeter shape. The base perimeter shape is not considered important and may depend upon a number of factors including the size and shape of the lighting element (200) and the desired aesthetic appearance. Preferred base perimeter shapes include a square, a rectangle, a parallelogram, a trapezoid, a pentagon, a hexagon, an octagon, a circle, and an oval. As used herein and in the claims, the term base length dimension is defined as the largest dimension of the base parallel to the base top surface. As used herein and in the claims, the term base width dimension is defined as the largest dimension of the base perpendicular to the base length dimension. In some embodiments, such as when the base has a square base perimeter shape or a circular base perimeter shape, the base length dimension may be equal to the base width dimension.

The base (100) will further comprise at least one magnet (150). In some embodiments, the base consists of a magnet—meaning that the entire base is fabricated from a magnet. In other embodiments, the base may be fabricated from a material other than a magnet, and the at least one magnet may be connected to the base. In such embodiments, the at least one magnet may comprise a number of magnets in a range selected from the group consisting of between 1 and 100, between 1 and 50, between 1 and 25, between 1 and 10, between 1 and 5, between 2 and 100, between 2 and 50, between 2 and 25, between 2 and 10, between 2 and 5, between 5 and 100, between 5 and 50, between 5 and 25, between 5 and 10, between 10 and 100, between 10 and 50, between 10 and 25, between 25 and 100, between 25 and 50, and between 50 and 100.

As shown in FIG. 4, in some embodiments where the at least one magnet (150) is connected to the base (100), the base may comprise a magnet hole (145 as shown in FIG. 3) in the base bottom surface (140). The magnet hole may be a through hole (not shown) in which the magnet hole passes all the way from the base bottom surface through the base top surface (130), or the magnet hole may be a blind hole (as shown in FIG. 3) in which the magnet hole does not pass all the way through the base top surface.

In some embodiments where the base (100) is fabricated from a material other than a magnet, and the base bottom surface (140) comprises at least one magnet hole (145), there may be more than one magnet. In general, the at least one magnet may comprise a number of magnets in a range selected from the group consisting of between 1 and 100, between 1 and 50, between 1 and 25, between 1 and 10, between 1 and 5, between 2 and 100, between 2 and 50, between 2 and 25, between 2 and 10, between 2 and 5, between 5 and 100, between 5 and 50, between 5 and 25, between 5 and 10, between 10 and 100, between 10 and 50, between 10 and 25, between 25 and 100, between 25 and 50, and between 50 and 100. It will be understood that the number of magnet holes should be equal to the number of magnets, and that each magnet should be connected to the base within one of the magnet holes.

The type and size of the magnet(s) is not considered relevant and will depend upon a number of variables including the intended application for the lighting fixture and the weight of the lighting fixture. The type of magnet may be selected from the group consisting of rare-earth magnets, ferrite magnets, ceramic magnets, electromagnets, and combinations thereof. One preferred rare-earth magnet is a neodymium magnet. In some embodiments, an electromagnet may be used in combination with one or more other type of magnet (such as a rare-earth magnet, a ferrite magnet, and/or a ceramic magnet) to increase the strength of the magnet field when the lighting fixture receives power from the power source as described herein.

Each individual magnet that makes up the plurality of magnets will have a pull force, also known as a release force. Pull force, or release force, is defined as the amount of force (measured in Newtons) required to break the magnet free when it is attached to a steel plate. The pull forces of all the magnet(s) included in the plurality of magnets may be added together to calculate a total pull force for the plurality of magnets. In general, the total pull force should be equal to or greater than the weight of the lighting fixture. Depending upon the application, the total pull force may be in a range selected from the group consisting of between 5 N and 2,000 N, between 5 N and 1,000 N, between 5 N and 500 N, between 5 N and 250 N, between 5 N and 100 N, and between 5 N and 50 N.

The at least one magnet (150) may be connected to the base (100) by a variety of mechanisms. For instance, in some embodiments, a magnet may be connected to the base by press fitting the magnet into a magnet hole (145). Press fitting may comprise forming the magnet hole in the base such that the magnet hole has a slightly smaller diameter than that of the magnet itself, then applying a force to the magnet perpendicular to the base bottom surface using a hydraulic press or similar apparatus to force the magnet into the magnet hole. By slightly smaller diameter it is meant that the diameter of the magnet hole may be selected from the group consisting of between 0.01% and 2.0% less than the diameter of the magnet, between 0.01% and 1.5% less than the diameter of the magnet, between 0.01% and 1.0% less than the diameter of the magnet, between 0.01% and 0.5% less than the diameter of the magnet, between 0.01% and 0.1% less than the diameter of the magnet, between 0.1% and 2.0% less than the diameter of the magnet, between 0.1% and 1.5% less than the diameter of the magnet, between 0.1% and 1.0% less than the diameter of the magnet, between 0.1% and 0.5% less than the diameter of the magnet, between 0.5% and 2.0% less than the diameter of the magnet, between 0.5% and 1.5% less than the diameter of the magnet, between 0.5% and 1.0% less than the diameter of the magnet, between 1.0% and 2.0% less than the diameter of the magnet, between 1.0% and 1.5% less than the diameter of the magnet, and between 1.5% and 2.0% less than the diameter of the magnet.

Another mechanism for connecting the at least one magnet (150) to the base (100) may comprise an adhesive. Yet another mechanism for connecting the at least one magnet to the base may comprise a first fastener (155) which passes through a hole in the magnet and into the base material. The first fastener may be selected from the group consisting of a screw, a bolt, or a rivet.

The mechanisms for connecting the at least one magnet (150) to the base (100) are not considered mutually exclusive. For example, any one magnet may be connected to the base by a combination of a press fit, an adhesive, and a first fastener. In embodiments having more than one magnet, each individual magnet may be connected to the base by any combination of a press fit, an adhesive, and a first fastener.

In embodiments where the base comprises a magnet hole, it is preferred that the magnet is connected to the base in a manner such that less than 10% of the magnet thickness dimension (152 as shown in FIG. 2) extends past the base bottom surface with less than 5% of the magnet thickness dimension extending past the base bottom surface being more preferred, less than 1% of the magnet thickness dimension extending past the base bottom surface being still more preferred, and 0% of the magnet thickness dimension extending past the base bottom surface being most preferred. In some embodiments, the magnet may be mounted in such a way that the magnet bottom surface is flush with the base bottom surface.

The base may be manufactured from a variety of materials including metals, plastics, and rubbers. Preferred metals include steel and aluminum. Preferred plastics include high density polyethylene (HDPE). In some embodiments, the base may comprise a coating.

FIG. 5 depicts a perspective view of one embodiment of a spacer (300). As shown in FIG. 5, the spacer has a spacer top surface (330) and a spacer bottom surface (340) opposite the spacer top surface. The spacer also has a spacer length dimension (310) and a spacer width dimension (320) which define a spacer perimeter having a spacer perimeter shape. The spacer perimeter shape is not considered important, but in general should be the same as or similar to the base perimeter shape. Preferred spacer perimeter shapes include a square, a rectangle, a parallelogram, a trapezoid, a pentagon, a hexagon, an octagon, a circle, and an oval. As used herein and in the claims, the term spacer length dimension is defined as the largest dimension of the spacer parallel to the spacer top surface. As used herein and in the claims the term spacer width dimension is defined as the largest dimension of the spacer perpendicular to the spacer length dimension. In some embodiments, such as when the spacer has a square spacer perimeter shape or a circular spacer perimeter shape, the spacer length dimension may be equal to the spacer width dimension. In preferred embodiments, the spacer length dimension will be the same as or similar to the base length dimension while the spacer width dimension will be the same as or similar to base width dimension. However, embodiments may exist where one or both of the spacer length dimension and/or the spacer width dimension is larger or smaller than the corresponding base length dimension and/or base width dimension.

Figure 6:
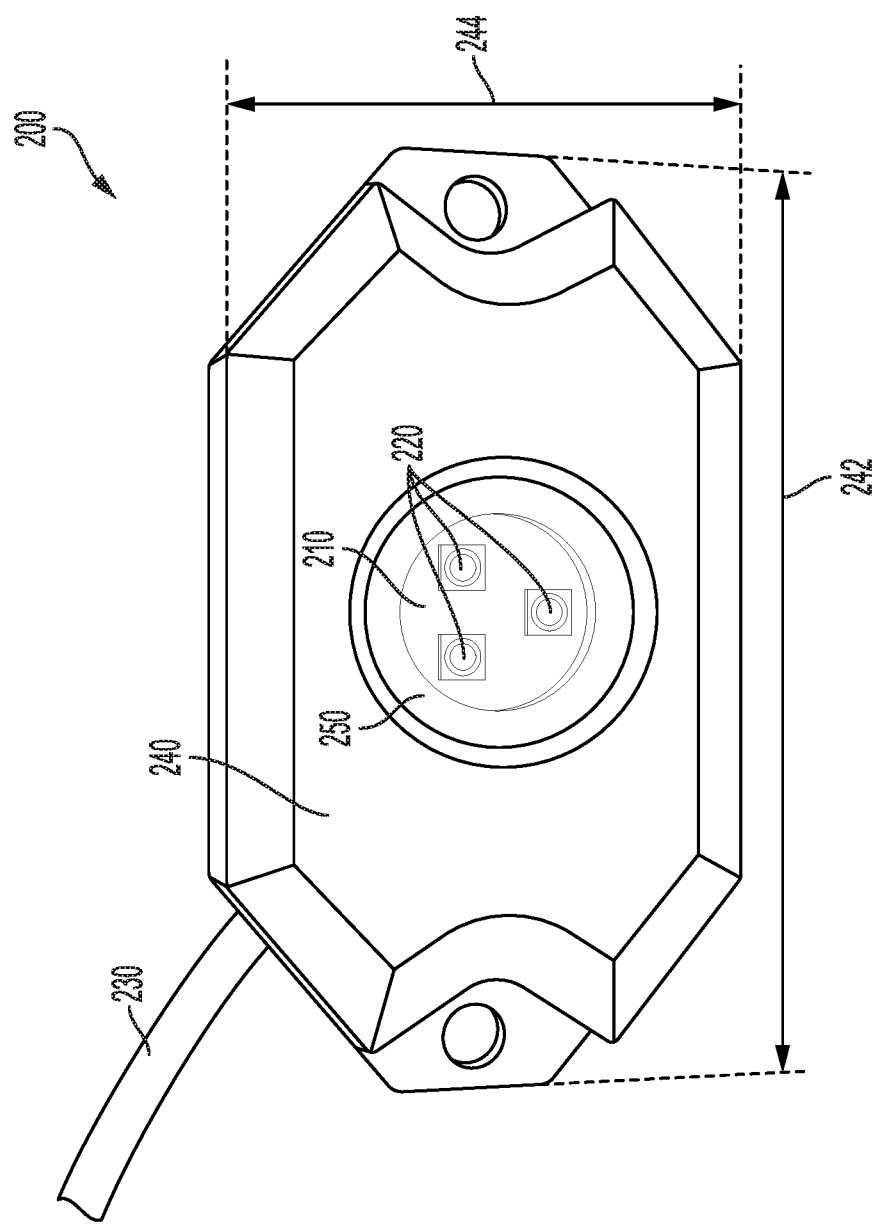
FIG. 6 is a top view of a lighting element.

As shown in FIG. 5, the spacer top surface may have at least one spacer recess (335). The size and location of the spacer recess is not considered important, but in general the spacer recess should be configured to the dimensions of an electrical communication connection (230 as shown in FIG. 6) such that at least a portion of the electrical communication connection fits within the spacer recess when the lighting fixture (10) is assembled as shown in FIG. 1. In other words, the spacer recess should be of sufficient length, width, and depth to allow at least a portion of the electrical communication connection to fit within the spacer recess when the lighting fixture is assembled while maintaining physical contact between the spacer top surface and the lighting element bottom surface. In some embodiments, there may be more than one spacer recess (335) allowing the electrical communication connection (230) to be routed in different directions when the lighting fixture is assembled.

In some embodiments, at least one of the at least one spacer recess extends from the spacer top surface (330) through the spacer bottom surface (340). In other words, at least one of the at least one spacer recess is a spacer recess through hole. In such embodiments, it is preferred that the base (100) also comprise at least one base recess (135) extending from the base top surface (130) through the base bottom surface (140)—i.e. a base through hole. Such embodiments allow for the electrical communication connection (230) to pass through the spacer and the base to be electrically connected to a power source.

The at least one spacer recess (335) is not considered a necessary feature. In some embodiments, the electrical communication connection (230) may be electrically connected to the printed circuit board (210) of the lighting element (200) and extend from the lighting element in a direction—such as from the side of the lighting element—which obviates the need for a spacer recess in the spacer (300). In which case, the spacer may have no spacer recess.

In some embodiments, the spacer (300) may comprise a lip (350). When the spacer comprises a lip, the lip may extend from the spacer top surface (330) along at least a portion of the spacer perimeter. When present, the lip may serve as a locating indicator for connecting the lighting element (200) to the spacer, and to reduce or prevent movement of the lighting element parallel to the spacer top surface.

The spacer may be made of a variety of materials—some of which may be rigid and others of which may be flexible. Preferably, the spacer may comprise a material selected from the group consisting of plastic, rubber, high density foam, cork, and metal.

FIG. 6 depicts a top view of one embodiment of a lighting element (200). As shown in FIG. 6, the lighting element may comprise a printed circuit board (210), a plurality of light emitting diodes (220), and an electrical communication connection (230). The printed circuit board (210) may have a first face and a second face opposite the first face. When the lighting fixture is installed onto a surface, the first face will face away from the surface, while the second face will face towards the surface.

The printed circuit board (210) may come in many different sizes and shapes. In practice, the size and shape of the printed circuit board should be the same as or similar to that of the base perimeter shape and/or the spacer perimeter shape. Preferred printed circuit board shapes include a square, a rectangle, a parallelogram, a trapezoid, a pentagon, a hexagon, an octagon, a circle, and an oval. In preferred embodiments, the printed circuit board will have a printed circuit board length dimension which is the same as or similar to the base length dimension and/or the spacer length dimension. Also, in preferred embodiments, the printed circuit board will have a printed circuit board width dimension which is the same as or similar to the base width dimension and/or the spacer width dimension. However, embodiments may exist where one or both of the printed circuit board length dimension and/or the printed circuit board width dimension is larger or smaller than the corresponding base length dimension and/or spacer length dimension and/or the corresponding base width dimension and/or space width dimension.

The light emitting diodes (220)—also known as LEDs—may be mounted on the first face of the printed circuit board. In other words, the plurality of light emitting diodes may each be mounted on the printed circuit board at the first face. A light emitting diode is a semiconductor light source which emits light when current flows through it.

Light emitting diodes come in a number of configurations. One common configuration of light emitting diode is a surface-mounted device (SMD). An SMD light emitting diode is mounted or placed directly onto the surface of a printed circuit board. Another configuration is through-hole technology in which a lead on the light emitting diode is inserted into a hole drilled into a printed circuit board and soldered to pads on the opposite side. Another configuration is chip on board (COB) LEDs in which a bare chip is mounted directly onto the printed circuit board. The specific configuration of light emitting diode is not considered important to the invention and can be selected from the group consisting of a surface-mounted device, a through-hole device, a chip on board (COB) LED, and combinations thereof.

Light emitting diodes come in a variety of colors. Two common colors for automotive applications are white light emitting diodes, and color changing light emitting diodes. Accordingly, in some embodiments, the plurality of light emitting diodes may comprise at least one white LED. In other embodiments, each light emitting diode of the plurality of light emitting diodes may be a white LED. In still other embodiments, the plurality of light emitting diodes may comprise at least one color changing LED. In yet other embodiments, each light emitting diode of the plurality of light emitting diodes may be a color changing LED. Other common colors for the light emitting diodes include red, green, blue, orange, yellow, purple, and combinations thereof.

The printed circuit board will be electrically connected to a power source. In some embodiments, the power source may be internal to the lighting fixture such as a battery or a solar panel built into the lighting element and/or the optional housing. In other embodiments, the power source may be external to the lighting fixture such as an automotive battery or a hard wire to an electrical grid. In embodiments where the power source is external to the lighting fixture, the lighting element may further comprise an electrical communication connection (230). FIG. 6 also shows the electrical communication connection electrically connected to the printed circuit board (210). The electrical communication connection may comprise a plurality of wires electrically connected at a first end to the printed circuit board and at a second end to a connector. The type and configuration of connector will depend upon a number of different variables including, the intended use for the lighting fixture, and the intended effect of the lighting element. The connector may then be electrically connected to an external power source. In vehicular applications, the external power source may be located within the vehicle which allows the lighting element to be turned on or off. In non-vehicular applications, the external power source may be a hard wire to an electrical grid. In either vehicular or non-vehicular applications, the power source may be a battery.

In some embodiments, the lighting element (200) may also include a lens (250). The lens may be transparent, or may include surface features such as coloring, opaque materials, texturing, and diffusing materials. In some embodiments, the lens will be contained within a housing (240) as shown in FIG. 6. In other embodiments (not shown), the lens may surround the printed circuit board (210) such that the entire lens itself acts as a housing.

Figure 7:
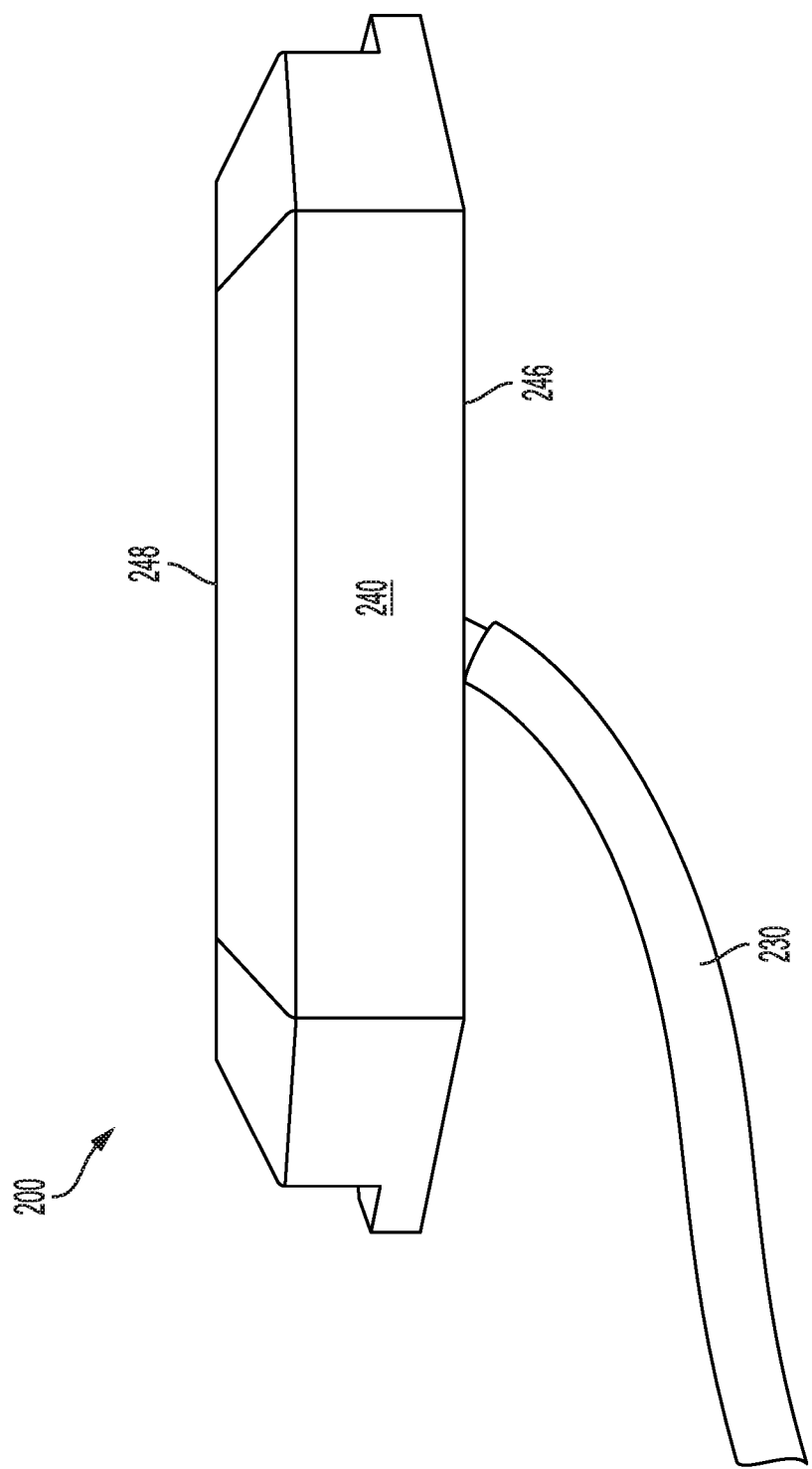
FIG. 7 is a side view of the lighting element of FIG. 6.

FIG. 6 further shows the lighting element (200) comprising a housing (240). As shown in FIG. 6, the housing may fully or at least partially surround the printed circuit board (210). The housing has a housing length dimension (242) and a housing width dimension (244) which define a housing perimeter having a housing perimeter shape. The housing perimeter shape is not considered important, but in general should be the same as or similar to the base perimeter shape, the spacer perimeter shape, and/or the printed circuit board perimeter shape. Preferred housing perimeter shapes include a square, a rectangle, a parallelogram, a trapezoid, a pentagon, a hexagon, an octagon, a circle, and an oval. As used herein and in the claims, the term housing length dimension is defined as the largest dimension of the housing parallel to the housing bottom surface (246 as shown in FIG. 7). As used herein and in the claims, the term housing width dimension is defined as the largest dimension of the housing perpendicular to the housing length dimension. In some embodiments, such as when the housing has a square housing perimeter shape or a circular housing perimeter shape, the housing length dimension may be equal to the housing width dimension. In preferred embodiments, the housing length dimension will be the same as or similar to the base length dimension and/or the spacer length dimension while the housing width dimension will be the same as or similar to the base width dimension and/or the spacer width dimension. However, embodiments may exist where one or both of the housing length dimension and/or the housing width dimension is larger or smaller than the corresponding base length dimension, spacer length dimension, base width dimension, and/or spacer width dimension.

FIG. 7 depicts a side view of the lighting element (200) of FIG. 6, including the housing (240). As shown in FIG. 7, the housing has a housing bottom surface (246) and a housing top surface (248). The housing may also comprise at least one sidewall extending from the housing bottom surface to the housing top surface. In some embodiments all or a portion of the housing sidewall may taper inwardly (as shown in FIG. 7) or outwardly as the housing sidewall extends from the housing bottom surface towards the housing top surface. In such embodiments, the housing top surface may have a housing length dimension and/or a housing width dimension which differs from the housing bottom surface. As used herein and in the claims, the housing length dimension and the housing width dimension are measured from the housing bottom surface.

Figure 8:
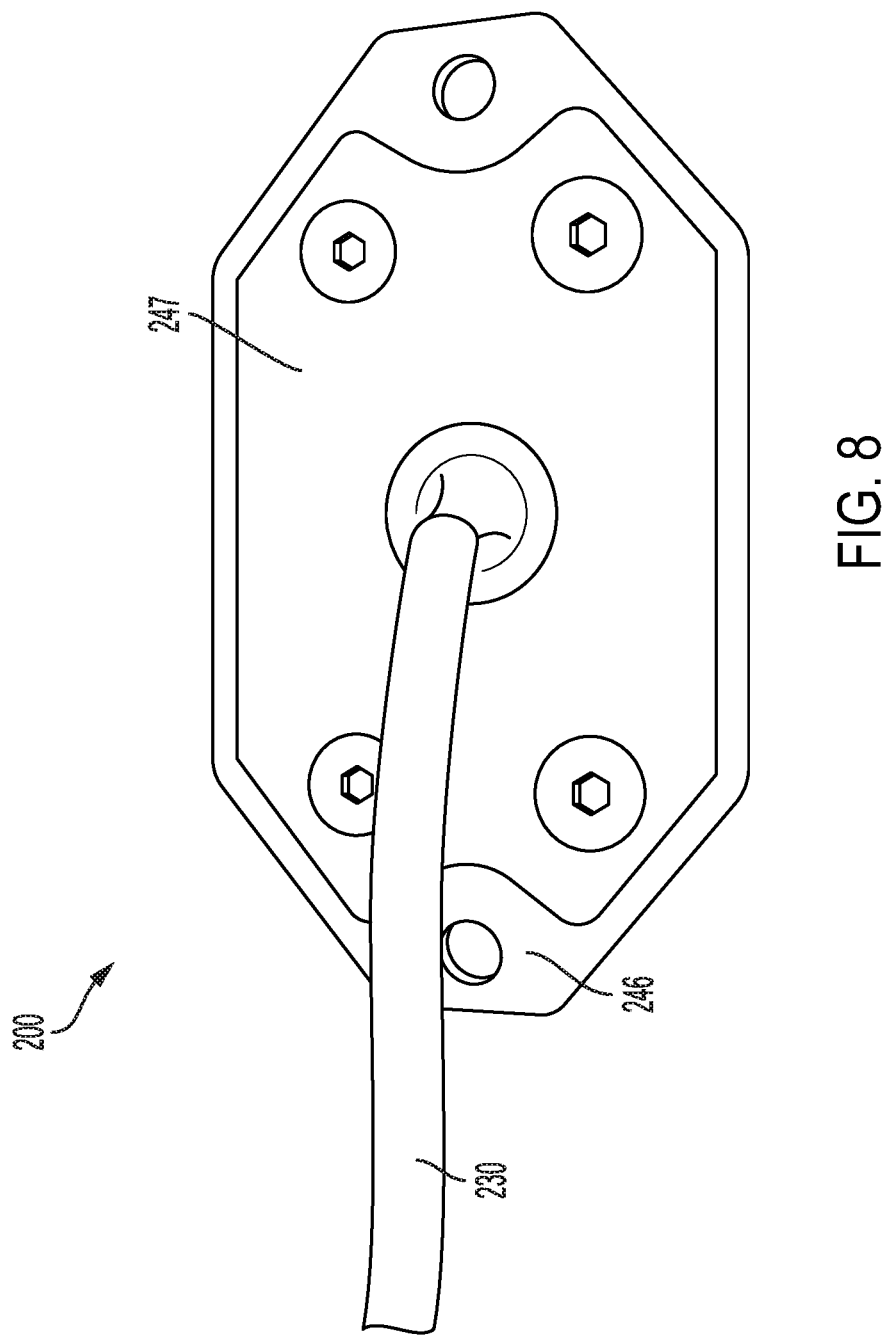
FIG. 8 is a bottom view of the lighting element of FIG. 6.

FIG. 8 depicts a bottom view of the lighting element (200) of FIG. 6, including the housing (240). As shown in FIG. 8, the housing bottom surface (246) may include a removable panel (247). The removable panel—when used—may be screwed, riveted, or snapped into place. When used, the removable panel allows the housing to be disassembled to provide access to the electronic components (printed circuit board, light emitting diodes, electrical communication connection) within the housing for repair and/or replacement.

Figure 9:
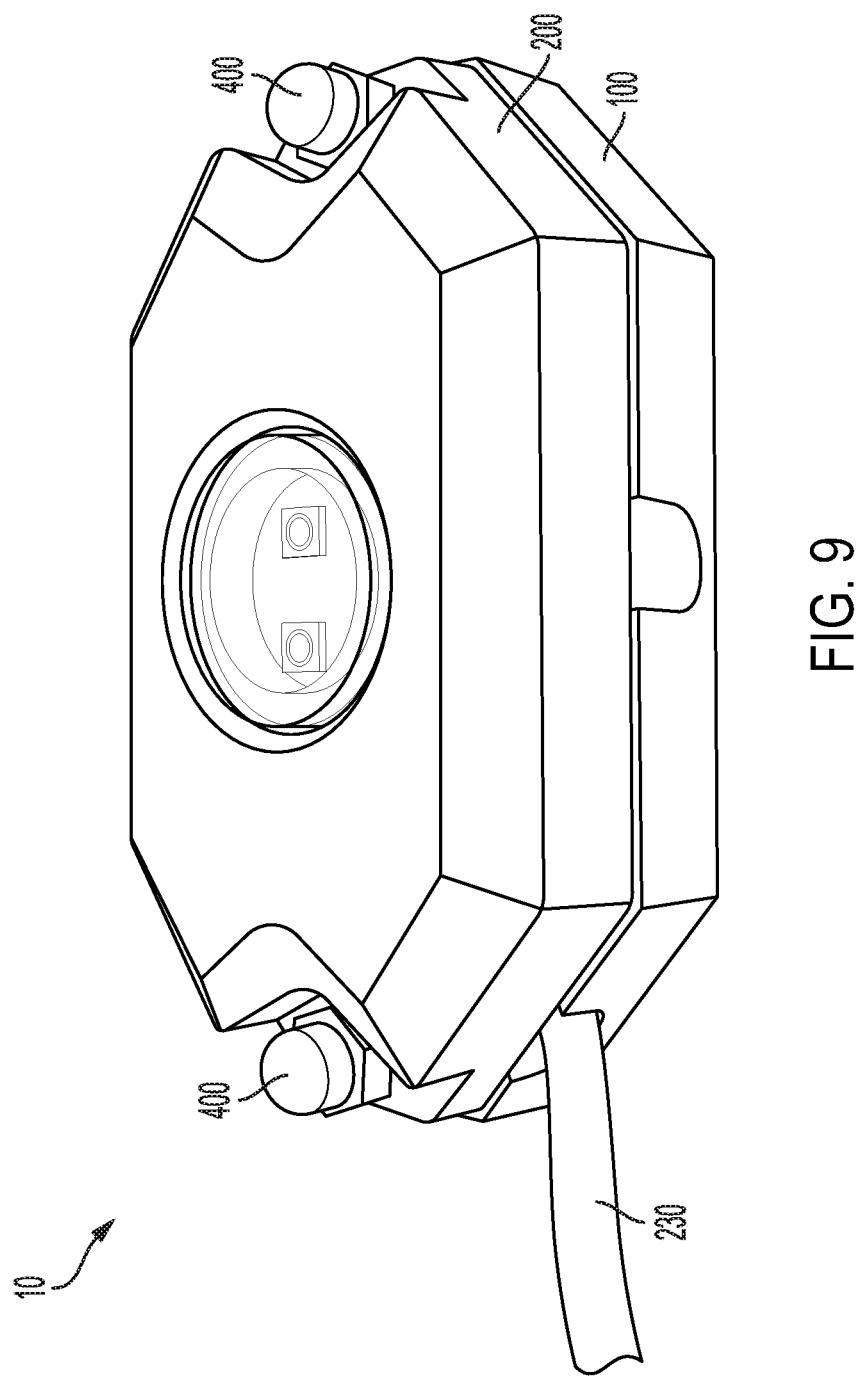
FIG. 9 is a perspective view of an alternative lighting fixture.
Figure 10:
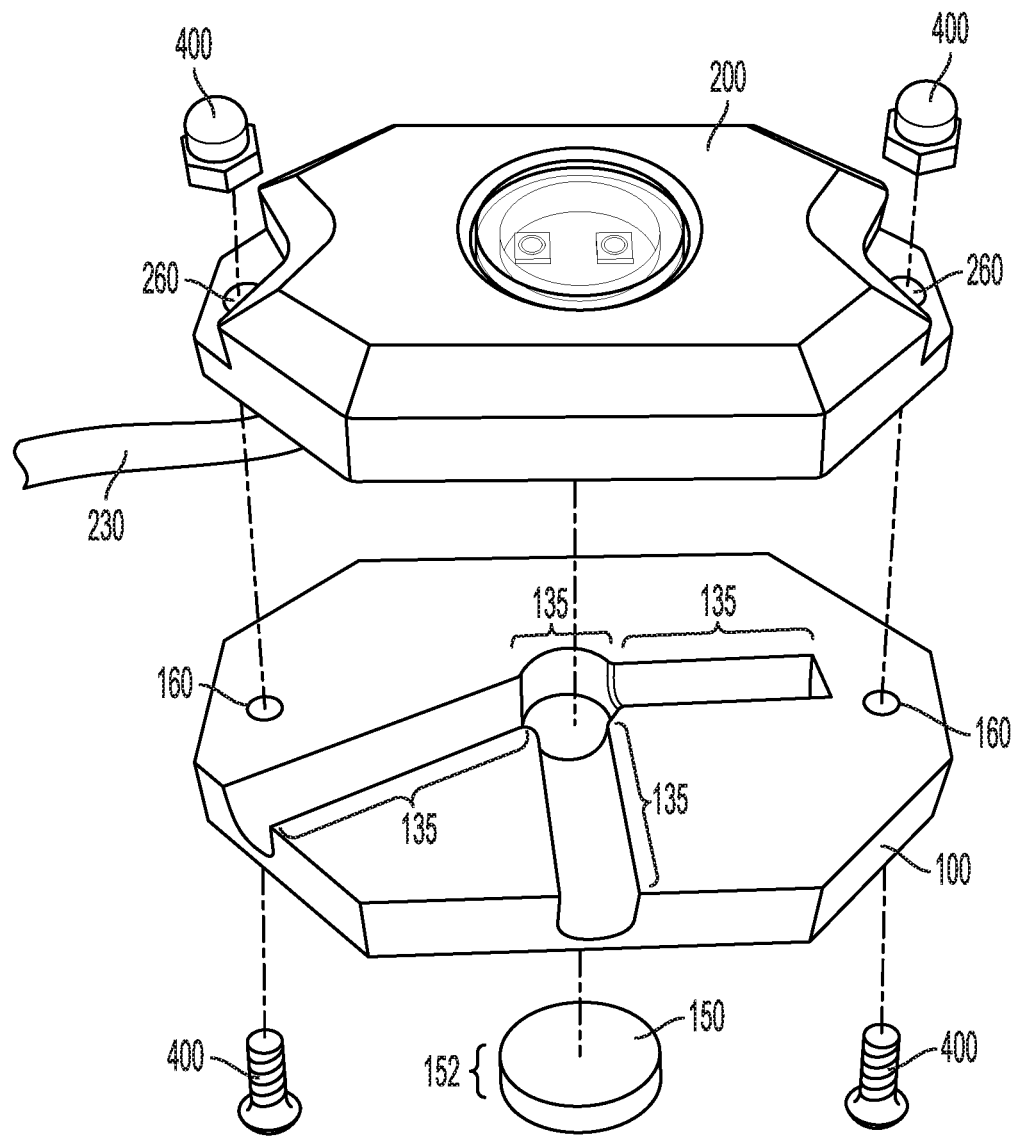
FIG. 10 is an exploded perspective view of the alternative lighting fixture of FIG. 9.

In some embodiments, such as those shown in FIGS. 9 and 10, the spacer may be eliminated so that the lighting fixture (10) comprises only the base (100), the lighting element (200), and the attachment mechanism (400). FIG. 9 shows an assembled perspective view of one such embodiment, with FIG. 10 shown the exploded perspective view of the embodiment shown in FIG. 9.

As shown in FIG. 10, when the spacer is eliminated, the base (100) may comprise at least one base recess (135). The size and location of the base recess is not considered important, but in general the base recess should be configured to the dimensions of an electrical communication connection (230 as shown in FIG. 6) such that at least a portion of the electrical communication connection fits within the base recess when the lighting fixture (10) is assembled as shown in FIG. 9. In other words, the base recess should be of sufficient length, width, and depth to allow at least a portion of the electrical communication connection to fit within the base recess when the lighting fixture is assembled while maintaining physical contact between the base top surface and the lighting element bottom surface. In some embodiments, there may be more than one base recess allowing the electrical communication connection to be routed in different directions when the lighting fixture is assembled.

In some embodiments, at least one of the at least one base recess (135) extends from the base top surface (130 as shown in FIG. 3) through the base bottom surface (140 as shown in FIG. 3). In other words, at least one of the at least one base recess is a base recess through hole. Such embodiments allow for the electrical communication connection (230) to pass through the base to be electrically connected to a power source.

The at least one base recess (135) is not considered a necessary feature. In some embodiments, the electrical communication connection (230) may be electrically connected to the printed circuit board (210) of the lighting element (200) and extend from the lighting element in a direction—such as from the side of the lighting element—which obviates the need for a base recess in the base (100). In which case, the base may have no base recess.

FIG. 10 also shows the attachment mechanism (400) for an embodiment without a spacer, which is shown in FIG. 10 as a screw with a nut. Other attachment mechanisms may include a screw, a bolt, a bolt with a nut, a snap in attachment mechanism, an adhesive, a rivet, and a clip. In other words, the attachment mechanism may be selected from the group consisting of at least one screw, at least one screw with a nut, at least one bolt, at least one bolt with a nut, at least one snap in attachment mechanism, an adhesive, at least one rivet, at least one clip, and combinations thereof.

In embodiments without a spacer where the attachment mechanism (400) is selected from the group consisting of at least one screw with a nut, at least one bolt with a nut, and combinations thereof, the base (100) and the lighting element (200) may also comprise one or more attachment holes as shown in FIG. 10. For example, the base may comprise at least one base attachment hole (160) passing from the base top surface (130 as shown in FIG. 3) through the base bottom surface (140 as shown in FIG. 3). Additionally, the lighting element may comprise at least one lighting element attachment hole (260). The number of base attachment holes and lighting element attachment holes is not considered important and will vary depending upon a number of factors including the desired use of the lighting fixture. As shown in FIG. 10, each of the base and the lighting element comprises two attachment holes. In practice, the number of base attachment holes should equal the number of lighting attachment holes.

In such embodiments, when assembled, at least one of the lighting element attachment holes (260) will be vertically aligned with at least one of the base attachment holes (160) as shown in FIG. 10. In embodiments where each of the base (100) and the lighting element (200) comprises multiple attachment holes, it is preferred that each base attachment hole be vertically aligned with a corresponding lighting element attachment hole as shown in FIG. 10. The vertical alignment of the attachment holes allows an attachment mechanism (400) to pass through the at least one base attachment hole and the at least one lighting element attachment hole to attach the base, and the lighting element to one another as shown in FIG. 9. In practice, it is preferred that a separate attachment mechanism passes through each separate set of a base attachment hole and a lighting element attachment hole as shown in FIG. 9 and FIG. 10.

It may be desirable to maintain a flat bottom surface to the base (100) to improve the contact area between the base and the surface to which the lighting fixture (10) is attached. To accommodate this, in some embodiments without a spacer, the base attachment hole(s) (160) may be countersunk at the base bottom surface (140) as shown in FIG. 4 allowing the base attachment holes to accept a screw or bolt having a tapered head as shown in FIG. 10.

The lighting fixture disclosed herein may also be in the form of a lighting fixture kit. The lighting fixture kit may comprise a base of the type disclosed herein, a lighting element of the type disclosed herein, and at least one attachment mechanism of the type disclosed herein. In some embodiments, the lighting fixture kit may also comprise a spacer of the type disclosed herein.

The lighting fixture and lighting fixture kit disclosed herein is useful for a variety of lighting applications. In some applications the lighting fixture may be attached to a ferrous surface of a vehicle, such as a vehicle chassis or subframe. In vehicular applications, the lighting fixture may serve a variety of lighting functions including a rock light, a flood light, a puddle light, or an accent light. In other applications the lighting fixture may be attached to a ferrous surface of a residential, commercial, or industrial structure to provide illuminations of various areas in and around said structures.

What is claimed is:

1. A lighting fixture (10) comprising:
    a base (100) comprising:
        a base length dimension (110), and a base width dimension (120) defining a base perimeter having a base perimeter shape,
        a base top surface (130),
        a base bottom surface (140) opposite the base top surface, and
        at least one magnet (150);

a lighting element (200) comprising:
   a printed circuit board (210), and
   a plurality of light emitting diodes (220) each mounted on the printed circuit board; and
an attachment mechanism (400); and
wherein the printed circuit board is electrically connected to a power source, the attachment mechanism connects the base to the lighting element, and the base comprises at least one base attachment hole (160) passing from the base top surface through the base bottom surface, the lighting element comprises at least one lighting element attachment hole (260) aligned with the at least one base attachment hole, the attachment mechanism passes through the at least one base attachment hole and the at least one lighting element attachment hole, and the attachment mechanism is a threaded fastener with or without a nut.

2. The lighting fixture of claim 1, wherein the threaded fastener comprises a tapered head, and the at least one base attachment hole is countersunk at the base bottom surface.

3. The lighting fixture of claim 1, wherein the at least one magnet comprises one or more magnets selected from the group consisting of rare-earth magnets, ferrite magnets, ceramic magnets, electromagnets, and combinations thereof.

4. The lighting fixture of claim 1, wherein the at least one magnet comprises a plurality of magnets, the plurality of magnets has a total pull force, the total pull force is equal to or greater than a weight of the lighting fixture, and the total pull force is in a range selected from the group consisting of between 5 N and 2,000 N, between 5 N and 1,000 N, between 5 N and 500 N, between 5 N and 250 N, between 5 N and 100 N, and between 5 N and 50 N.

5. The lighting fixture of claim 1, wherein the base consists of a magnet.

6. The lighting fixture of claim 1, wherein the base bottom surface has at least one magnet hole (145), the number of magnet holes is equal to a number of magnets of the at least one magnet, and each magnet is connected to the base within one of the magnet holes.

7. The lighting fixture of claim 1, wherein the base top surface has at least one base recess (135).

8. The lighting fixture of claim 7, wherein at least one of the at least one base recess extends from the base top surface through the base bottom surface.

9. The lighting fixture of claim 1, wherein the plurality of light emitting diodes comprises at least one white LED.

10. The lighting fixture of claim 1, wherein the plurality of light emitting diodes comprises at least one color changing LED.

11. The lighting fixture of claim 1, wherein the attachment mechanism is selected from the group consisting of at least one screw, at least one screw with a nut, at least one bolt, at least one bolt with a nut, at least one snap in attachment mechanism, an adhesive, at least one rivet, at least one clip, and combinations thereof.

\* \* \* \* \*